United States Patent Office 2,853,523
Patented Sept. 23, 1958

2,853,523

METHOD OF PREPARING 2,2'-DIHYDROXY-4,4'-DIALKOXYBENZOPHENONES

William H. von Glahn, Loudonville, and Lester N. Stanley, Delmar, N. Y., assignors to General Aniline & Film Corporation, New York, N. Y., a corporation of Delaware No Drawing. Application June 22, 1956
Serial No. 593,022

6 Claims. (Cl. 260—591)

The present invention relates to an improved process of preparing 2,2'-dihydroxy-4,4'-dialkoxybenzophenones.

It is known that 2,2'-dihydroxy-4,4'-dialkoxybenzophenones are utilized as absorbents for ultraviolet light in various transparent sheet materials and for the stabilization of transparent plastics. When such compounds are utilized as ultraviolet absorbers in materials, such as plastics, resins, film forming materials, including colored textiles, and the like, it is extremely important that the compounds be of the highest degree of purity and stability upon storage.

The 2,2'-dihydroxy-4,4'-dialkoxybenzophenones are usually prepared by condensing a resorcinol dialkyl ether with a carbonylating agent, such as phosgene, in the presence of aluminum chloride. As a specific example, U. S. Patent 2,693,492 describes the producton of 2,2'-dihydroxy-4,4'-dialkoxybenzophenones by condensing 2 moles resorcinol dialkyl ether with 1 mole phosgene in the presence of 2 moles aluminum chloride in the presence of an inert solvent-diluent at a temperature ranging between 4° and 55° C., decomposing the aluminum chloride complex with ice and hydrochloric acid, separating the organic layer and extracting it with caustic alkali, and acidifying to obtain the desired benzophenone. Subsequent crystallization yield the final product.

The principal shortcoming of the foregoing procedure is that aluminum chloride alone is too reactive as a de-alkylating agent, as a result of which the desired di-de-alkylated product is always contaminated with the mono-, tri- and completely de-alkylated products, as well as other decomposition products. Inasmuch as it is essential for certain uses, such as ultraviolet absorbents for colorless organic film-forming plastics, resins, gums, waxes, etc., to utilize 2,2'-dihydroxy-4,4'-dialkoxybenzophenone of the highest purity, the presently available processes are incapable of yielding directly the said benzophenones in a high degree of purity.

We have discovered that the foregoing commercial procedure, can be improved decidedly to yield 2,2'-dihydroxy-4,4'-dialkoxybenzophenone of a high degree of purity and free from contaminants of the aforementioned type by replacing the aluminum chloride with a mixture of aluminum chloride and zinc chloride as the condensation and de-alkylating reagent.

By employing such a mixture the activity of the aluminum chloride is so regulated that the carbonylation occurs in an easy manner and when the condensation product is warmed in order to de-alkylate, control of the reaction is facilitated. As a result the di-de-alkylated product is produced in high degree of purity, in a good yield, and virtually free from contaminants. In general, the product is lighter in color, and can be dried more readily to give a good pulverulent product. It also has a somewhat higher solubility in hydrocarbon solvents.

Accordingly, it is an object of the present invention to provide an improved process of preparing 2,2'-dihydroxy-4,4'-dialkoxybenzophenones.

Other objects and advantages will become manifest from the following description:

The process involved in obtaining the foregoing compounds is carried out by first preparing the condensing and de-alkylating reagent which consists of the following:

| Aluminum Chloride, percent by weight | Zinc Chloride, percent by weight |
|---|---|
| 70-90 | 10-30 |

The mixture may be used as such by merely mixing it in a suitable solvent-diluent or in lieu thereof, the mixture may be first mixed and heated with stirring to a sufficiently high temperature to product a melt. Usually a temperature of about 150° C. is sufficient. The resulting melt, after cooling, is readily soluble or dispersible in the inert solvent-diluent. Other variations of employing the mixtures will become evident from the working examples.

In employing the mixture as a condensing and de-alkylating reagent the amount to be utilized ranges from 95–125 parts by weight per 100–180 parts by weight of a 1,3-dialkoxybenzene.

With the reagent prepared as above, the second step in the process consists of dissolving 100–180 parts by weight of a 1,3-dialkoxybenzene, such as 1,3-dimethoxybenzene, 1,3-diethoxybenzene, 1,3-diisopropoxybenzene, 1,3-di-n-butoxybenzene, and 1,3-diisoamyloxybenzene, and the like, in an inert solvent-diluent such as for example, nitrobenzene, carbon disulfide, ethylene dichloride, 1,1,1-trichloroethane, 1,1,2-trichloroethane, 1,3-dichloropropane, etc. The solution is cooled to between 0° C. and 10° C., and from 95–125 parts by weight of the aluminum chloride-zinc chloride mixture per 100–180 parts by weight of a 1,3-dialkoxybenzene added with stirring, and the temperature maintained at 0°–10° C. Through this mixture a steady stream of phosgene is passed, preferably at a temperature of 0°–5° C. The amount of phosgene employed is preferably in excess of the molecularly equivalent amount and may range up to 150% in excess so as to compensate for the loss during the reaction. After one hour the temperature is slowly raised and held at between about 45° C. to 75° C., and preferably at about 65°–70° C. for sufficient time for di-de-alkylation to take place, i. e. about 5–20 hours. The resulting solution is cooled to 0° C. and decomposed with an acidified ice water mixture. At this point an additional quantity of an inert solvent-diluent is added to dissolve the charge. It may be warmed in order to effect better solution, for example, up to 70° C. The lower oil layer is separated, extracted with dilute (<10%) aqueous sodium hydroxide or any other suitable caustic alkali. The basic solution, after the removal of the residual solvent-diluent and acidification with acid while maintaining a low temperature, i. e. below about 10° C., yields a pale yellow solid which is filtered, sucked dry, washed with cold water until salt free and dried. A satisfactory product is obtained which may be further purified, if desired, by a crystallization from a low boiling ketone to yield a product of high purity and free from contaminants.

The following examples will illustrate the improved process. All the parts given are by weight unless otherwise noted.

*Example I*

A mixture of the condensing and de-alkylating reagent was prepared by mixing together 11 grams of zinc chloride and 99 grams of aluminum chloride to yield a mixture weighing 110 grams. The mixture was heated to about 140°–150° C. under constant agitation until molten. The melt was cooled to 80° C., and 480 cc. of ethylene dichloride added. A substantial portion of the melt went into solution whereupon the mixture was cooled to 0° C. 100 grams of 1,3-dimethoxybenzene were added while maintaining the solution at 0°–5° C. At this point phosgene gas, approximately 42 grams, was passed through the solution while maintaining the same temperature, and then the charge slowly raised to and held at approximately 67° C. for 16 hours. The charge was cooled to 0° C. and drowned in a mixture of 360 cc. of water, 360 grams of ice, and 60 cc. of 21° Bé. hydrochloric acid. Extra ice was added to keep the temperature below 10° C. Approximately 500 cc. of ethylene dichloride was added and the charge heated to 55–60° C. until solution of the organic material was complete. The oil layer was separated, cooled to 20–25° C. and to it added 275 cc. of 10% by weight of caustic soda solution. The mixture was stirred for 15 minutes and the lower ethylene dichloride layer separated. The solution was filtered, and the filtrate added to 96 cc. of 21° Bé. of hydrochloric acid and 600 cc. of ice water while maintaining the temperature below 10° C. The charge was filtered, sucked dry, washed with cold water until salt free and then dried. A yield of approximately 65 grams (66% of theory) of a light yellow product was obtained which had a melting point of 135.1°–136° C. After one recrystallization from methyl ethyl ketone followed by drying, pure 2,2'-dihydroxy-4,4'-dimethoxybenzophenone having a melting point of 136°–137° C. was obtained.

*Example II*

To 480 cc. of ethylene dichloride, 11 grams of zinc chloride were added. At room temperature 99 grams of aluminum chloride were then added and the charge stirred for one hour after which 100 grams of 1,3-dimethoxybenzene were added at 0°–5° C. While maintaining the charge at this temperature, 42 grams of phosgene gas were passed through and the charge slowly raised to and maintained at about 67° C. over a period of 16 hours. At this point, the charge was treated as in Example I to yield 59 grams (60% of theory) of a product having a melting point of 133.4°–137° C. After one recrystallization from methyl ethyl ketone pure 2,2'-dihydroxy-4,4'-dimethoxybenzophenone was obtained having a melting point of 136° to 137° C. The proportions of the salts used in the de-alkylating mixture were the same as in Example I.

*Example III*

To 400 cc. of ethylene dichloride at room temperature were added 27.5 grams of zinc chloride and 82.5 grams of aluminum chloride. The charge was stirred for thirty minutes, then cooled to 0° C. 100 grams of 1,3-dimethoxybenzene were added at 0° C. and stirred well. At 0° C. 41 grams of phosgene gas were passed through the charge. The temperature was gradually raised and maintained at 67° C. over a period of 16 hours, and the charge then finished as in Example I. 59 grams (60% of theory) of 2,2'-dihydroxy-4,4'-dimethoxybenzophenone were obtained which had a melting point of 134°–136° C.

The product was recrystallized once from methyl ethyl ketone and after drying had a melting point of 136° to 137° C. The proportions of the salts used in the condensing and de-alkylating mixture are as follows:

| Aluminum Chloride, percent | Zinc Chloride, percent weight |
|---|---|
| 75 | 25 |

*Example IV*

To 480 grams of ethylene chloride were added 30 grams of zinc chloride. After cooling to 5° C., 70 grams of aluminum chloride were added. The charge was heated to reflux for a few minutes in order to obtain a solution, and then cooled to 0° C. 100 grams of 1,3-dimethoxybenzene were added and 42 grams of phosgene passed through at 0°–5° C. The charge was slowly raised to and maintained at 67° C. for about 16 hours, and then finished as in Example I. 58 grams (59% of theory) of 2,2'-dihydroxy-4,4'-dimethoxybenzophenone having a melting point of 127°–133.4° C. were obtained.

After a single recrystallization from methyl ethyl ketone followed by drying, the final product had a high degree of purity and had a melting point of 136° to 137° C.

*Example V*

Example I was repeated with the exception that 100 grams of 1,3-dimethoxybenzene were replaced by 120 grams of 1,3-diethoxybenzene. After recrystallization, the pale yellow 2,2'-dihydroxy-4,4'-diethoxybenzophenone was obtained which had ultraviolet absorption properties commensurate with the dimethoxy analogue. Its melting point after recrystallization was 120.6–122.4° C.

*Example VI*

Example I was repeated with the exception that 100 grams of 1,3-dimethoxybenzene were replaced by 140 grams of 1,3-diisopropoxybenzene. The pale yellow product showed ultraviolet absorption properties similar to the product obtained from the 1,3-dimethoxybenzene.

*Example VII*

Example I was repeated with the exception that 100 grams of 1,3-dimethoxybenzene were replaced by 160 grams of 1,3-di-n-butoxybenzene. The yellowish product had ultraviolet absorption properties similar to the product obtained from 1,3-dimethoxybenzene.

*Example VIII*

Example I was repeated with the exception that 100 grams of 1,3-dimethoxybenzene were replaced by 179 grams of 1,3-diisoamyloxybenzene. The yellowish product had ultraviolet absorption properties similar to the product obtained from 1,3-dimethoxybenzene.

*Example IX*

Example I was again repeated with the exception that the zinc chloride-aluminum chloride mixture was replaced by 109 parts of zinc chloride. The resulting product was primarily an oil insoluble in the caustic solution used in the extraction and was shown to be unreacted 1,3-dimethoxybenzene.

From the foregoing example it becomes clearly manifest that the use of zinc chloride alone is ineffective.

The ratio of 10–30% by weight of zinc chloride and 70–90% by weight of aluminum chloride is very critical and any combination outside of these proportions will yield a condensing and de-alkylating mixture which may give very poor yields of products which are dark in color with very low melting points, and in some instances, products of an ester-like odor. This has been definitely established by employing a mixture in which the proportions of aluminum chloride-zinc chloride per 100 grams of 1,3-dimethoxybenzene were as follows:

| | Aluminum Chloride | | Zinc Chloride | |
|---|---|---|---|---|
| | Percent | Weight in Grams | Percent | Weight in Grams |
| 1 | 50 | 55 | 50 | 55 |
| 2 | 61 | 67 | 39 | 43 |
| 3 | 95 | 104.5 | 5 | 5.5 |

Mixture 1 gave a poor yield of product having an ester-like odor with no definite melting point.

Mixture 2 gave a slightly better yield (17 grams) but still poor. The product had an ester-like odor with a melting point of 104–109° C. and was very impure.

Mixture 3 gave a product very dark in color with a melting point of 92°–94° C.

We claim:

1. The process of preparing 2,2'-dihydroxy-4,4'-dialkoxybenzophenones which comprises first condensing 100–180 parts by weight of 1,3-dialkoxybenzene with phosgene at a temperature ranging between 0° and 10° C. in the presence of an inert solvent-diluent and in the presence of a reagent mixture consisting of 10–30% by weight of zinc chloride and 70–90% by weight of aluminum chloride, said reagent mixture being employed in the range of 95–125 parts by weight per 100–180 parts by weight of said 1,3-dialkoxybenzene, then raising and holding the temperature between 45°–75° C. to dealkylate the condensation product, and isolating a 2,2'-dihydroxy-4,4'-dialkoxybenzophenone.

2. The process according to claim 1 wherein the 1,3-dialkoxybenzene is 1,3-dimethoxybenzene.

3. The process according to claim 1 wherein the 1,3-dialkoxybenzene is 1,3-diethoxybenzene.

4. The process according to claim 1 wherein the 1,3-dialkoxybenzene is 1,3-diisopropoxybenzene.

5. The process according to claim 1 wherein the 1,3-dialkoxybenzene is 1,3-di-n-butoxybenzene.

6. The process according to claim 1 wherein the 1,3-dialkoxybenzene is 1,3-di-isoamyloxybenzene.

References Cited in the file of this patent

UNITED STATES PATENTS

| | | |
|---|---|---|
| 2,686,812 | Wynn et al. | Aug. 17, 1954 |
| 2,693,492 | Hoch | Nov. 2, 1954 |
| 2,694,729 | Wynn et al. | Nov. 16, 1954 |

OTHER REFERENCES

Thomas: Anhyd. Aluminum Chloride in Org. Chem., pgs. 868–869, 874–876 (1941).